United States Patent
Wölfges

(10) Patent No.: US 6,628,186 B1
(45) Date of Patent: Sep. 30, 2003

(54) SOLENOID VALVE

(75) Inventor: Hans Wölfges, Lohr/Main (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 09/890,838

(22) PCT Filed: Feb. 9, 2000

(86) PCT No.: PCT/EP00/01013

§ 371 (c)(1),
(2), (4) Date: Aug. 3, 2001

(87) PCT Pub. No.: WO00/50794

PCT Pub. Date: Aug. 31, 2000

(30) Foreign Application Priority Data

Feb. 23, 1999  (DE) .......................... 199 07 732

(51) Int. Cl.⁷ ................................. H01F 7/08
(52) U.S. Cl. ...................... 335/220; 335/281; 335/255; 251/129.15
(58) Field of Search ............... 335/268, 261–2, 335/281–3, 257, 277, 250, 255, 256, 220–229; 251/129.01–129.22

(56) References Cited

U.S. PATENT DOCUMENTS

| | | | |
|---|---|---|---|
| 1,504,773 A | | 8/1924 | Marston |
| 4,153,890 A | | 5/1979 | Coors |
| 5,197,709 A | * | 3/1993 | Kroll et al. ............. 251/129.01 |
| 5,455,470 A | * | 10/1995 | Denk et al. .................... 310/90 |
| 5,503,184 A | * | 4/1996 | Reinartz et al. ............. 251/118 |
| 6,076,491 A | * | 6/2000 | Allen ....................... 123/90.16 |

FOREIGN PATENT DOCUMENTS

| | | |
|---|---|---|
| DE | 1111737 | 7/1961 |
| DE | 2643495 | 7/1977 |
| DE | 19527482 | 2/1996 |
| DE | 19611832 | 10/1997 |
| EP | 0759388 | 2/1997 |
| GB | 2032185 | 4/1980 |
| GB | 2187332 | 9/1987 |

* cited by examiner

Primary Examiner—Lincoln Donovan
(74) Attorney, Agent, or Firm—Martin A. Farber

(57) ABSTRACT

A proportional activation magnet (1) for a hydraulic solenoid valve has a pole (3) with a valve cone receiving bore (17) for receiving a valve cone (20) and a pole tube (14) for receiving an armature (30). An armature tappet (33) extends between the armature (30) and valve cone (20). A retention area (35) with a tappet passage opening (36) is provided around the armature tappet (33) in a region between the valve cone receiving bore (17) and pole tube (14). An annular gap with a predefined gap width is formed between the inside of the tappet passage opening (36) and the outside of the armature tappet (33) which extends in the tappet passage opening (36).

14 Claims, 2 Drawing Sheets

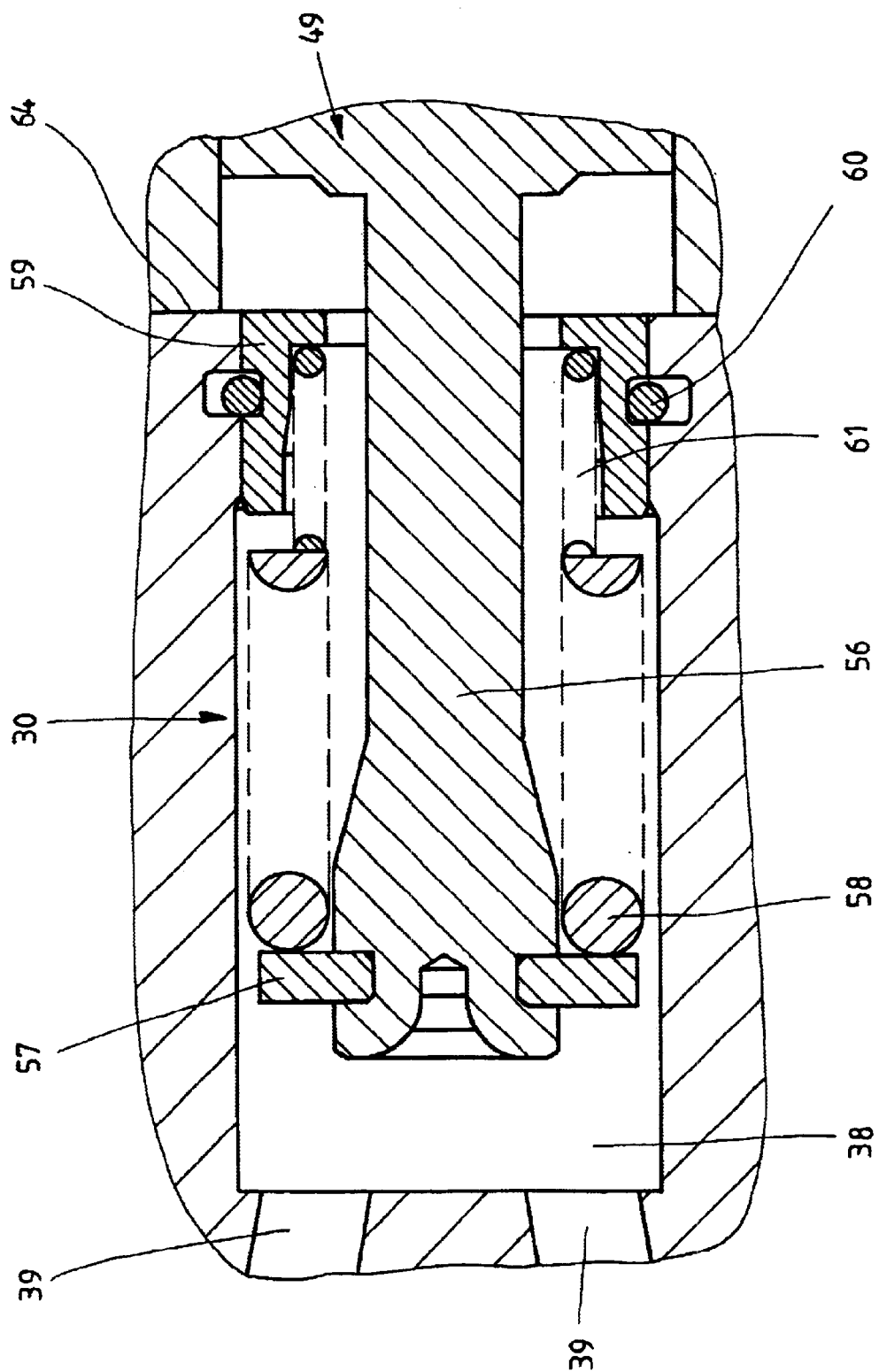

SOLENOID VALVE

RELATED APPLICATIONS

This application is a continuing examination of Ser. No. 09/890,838 and a 371 or PCT/EP00/01013 filed Feb. 9, 2000.

FIELD AND BACKGROUND OF THE INVENTION

The invention relates to a proportional activation magnet, in particular for a hydraulic valve.

The known activation magnets have a pole with a valve cone receiving bore for receiving a valve cone, and an essentially cylindrical pole tube with a pole tube bore for receiving an essentially cylindrical armature. In the known activation magnets, an air gap of approximately 0.1 mm to 0.4 mm is provided between the armature and the pole tube bore, or the armature space is open toward the external environment on the side of the armature tappet so that the hydraulic fluid can flow in and out into the armature space in an unthrottled fashion. Air and dirt can pass unimpeded into the armature space and disrupt the functioning of the proportional activation magnet. It is very difficult to remove the air completely from the long narrow gap between the armature and pole tube bore when venting the armature space provided in the pole tube. Furthermore, the known proportional activation magnets frequently have intermediate spaces and connecting bores in which air pockets form when they are filled with hydraulic oil.

Venting screws have not proven suitable here for venting because it would be necessary to provide a multiplicity of venting screws in order always to ensure venting from the highest point in the interior of the magnet when the installation position of the hydraulic solenoid valve changes.

Here, air bubbles which are present in the interior of the proportional activation magnet are particularly disadvantageous because they reduce the modular subcompression of the hydraulic fluid and thus considerably reduce the damping of the movement of the armature. This results in a situation in which the solenoid valve can easily be excited to oscillate, causing disruption in the operation of the hydraulic solenoid valve. In addition, dirt in the armature space can become caught in the armature bearing and thus lead to failure of the activation magnet.

The invention is therefore based on the object of making available a hydraulic solenoid valve and a proportional activation magnet, in particular for a hydraulic solenoid valve, with which reliable operation is always possible.

SUMMARY OF THE INVENTION

This object is achieved according to the invention by means of the subject matter of the independent claims. Advantageous developments emerge from the respective subclaims.

According to the invention, an armature tappet which has a smaller diameter than the armature and the valve cone is provided between the armature and valve cone. Furthermore, a retention area with a tappet passage opening is provided in the region between the valve cone receiving bore and pole tube around the armature tappet, an annular gap with a predetermined gap width being formed around the circumference of the tappet passage opening between the inside of the tappet passage opening and the outside of the armature tappet which extends in the tappet passage opening.

The invention accordingly provides for the hydraulic fluid to be capable of flowing in and out in a throttled fashion between the armature space and external surroundings on the side of the armature tappet so that a back pressure, which damps the movement of the armature, builds up in the armature space on the side of the armature tappet.

As a result of the region between the valve cone receiving bore and pole tube being formed according to the invention, good damping of the movement of the armature is always ensured. The hydraulic fluid which flows into the pole tube, or out of it, as a result of a movement of the armature in the pole tube must pass through the annular gap, in which case it is subject to a friction effect. As a result, the flow is subject to resistance which has a damping effect on the movement of the armature.

It is advantageous that the ingress of dirt and air into the pole tube is also effectively prevented by the embodiment with the annular gap around the armature tappet.

In the invention it has become apparent that a particularly advantageous solenoid valve with a proportional activation magnet is obtained if the diameter of the armature tappet is selected to be particularly small. On the one hand, this results in a low degree of exchange of oil between the pole tube and the valve cone receiving bore when the armature moves. On the other hand, given the same gap width the annular gap face is reduced in proportion with the diameter of the armature tappet. A small annular gap face increases the damping effect on the armature and reduces the risk of the ingress of air and/or dirt into the pole tube. In addition, the ingress of air and/or dirt into the pole tube is also counteracted by the low degree of exchange of oil between the pole tube and valve cone receiving bore. The armature tappet in the retention area should advantageously not experience friction in order to prevent any hysteresis of the activation magnet being increased.

With the embodiment according to the invention it has proven particularly effective to form the annular gap between the armature tappet and the tappet passage opening in such a way that the ratio of the gap width to the diameter of the armature tappet is smaller than 0.25 and in particular smaller than 0.05. This results in a good function if the annular gap width is 0.1 mm and if the tappet diameter is 2 mm. Given an armature diameter of 16.7 mm, reliable operation of the activation magnet according to the invention is then obtained. Further improvements are obtained if the annular gap is reduced still further, for example to dimensions of less than 0.1 mm. It is particularly advantageous here to embody the bearing of the armature in such a way that only a low degree of axial play occurs. Given such bearing of the armature, the gap width can in fact be reduced still further without the armature tappet experiencing friction in the retention area owing to the axial displacements of the armature, which would result in increased hysteresis of the activation magnet.

According to the invention, the gap width is to be embodied in such a way that when the armature moves there is marked damping of the movement of the armature owing to the throttling of the hydraulic oil in the annular gap.

With the embodiment of the activation magnet according to the invention the interior of the pole tube is also automatically vented so that venting screws can be dispensed with.

It is advantageous that the retention area is embodied as an essentially disk-shaped baffle plate which has the throttle passage opening arranged in its center. This results in particularly simple manufacture and mounting of the actuation magnet according to the invention.

Furthermore provided in the region between the outer surface of the armature and the pole tube bore is a film bearing which can also essentially completely fill the space between the outer surface of the armature and the pole tube bore. This results in a shape of the interior space of the pole tube which is such that air pockets can build up only with difficulty because the long narrow gap between the pole tube and armature is avoided by the film bearing.

In a further embodiment of the actuation magnet according to the invention, the pole tube can have, on its side facing away from the valve cone receiving bore, a closure lid which can contain various assemblies. It is therefore conceivable to embody the closure lid with an adjustment device for setting the working point of the armature. This can be done for example by providing an adjustment screw in the closure lid.

Furthermore, the closure lid can also have a restoring device for applying a restoring force to the armature. A restoring device which can in particular also project into the armature has proven effective for this. In this embodiment, the space which is taken up by the restoring device always has hydraulic fluid flowing through it which, during movements of the armature, moves within equalization bores provided in the armature. This effectively counteracts the formation and collection of air bubbles on the pole tube.

The restoring device exerts a restoring force on the armature and can be embodied in this respect in such a way that when the cone tip moves toward the valve seat a portion of the magnetic force is stored in two compression springs connected one behind the other in the armature movement direction. Here, an armature retraction spring is firstly slightly biased and the biasing force is limited by a stop. An oscillation damping spring is then further biased until the tip of the cone comes to rest in the valve seat. The spring constant of the oscillation damping spring is high. This spring is biased only by a few tens of millimeters. With this device, it is possible to carry out the zero point equalization of the set point pressure characteristic curve, pressure oscillations are damped and, given a set point value 0 after the oscillation damping spring is relieved of tension, the armature retraction spring retracts the armature against the closure lid stop face so that a small pressure gradient is brought out at the throttle gap between the valve seat and tip of the cone.

Finally, the armature can have a spring space which extends in the axial direction of the armature, from whose bore base at least one equalization bore extends to an end face of the armature. As a result, thorough scavenging of the armature with hydraulic fluid is ensured, counteracting the formation of air bubbles.

BRIEF DESCRIPTION OF THE DRAWINGS

Finally, the invention is also implemented in a hydraulic solenoid valve which has a proportional activation magnet embodied according to the invention.

The invention is illustrated in the drawing by means of an exemplary embodiment. In said drawing FIG. 2 shows a cross section through a partial region of the activation magnet from FIG. 1.

DETAILED DESCRIPTION OF THE PREFERRED EMBODIMENT

Figure 1:
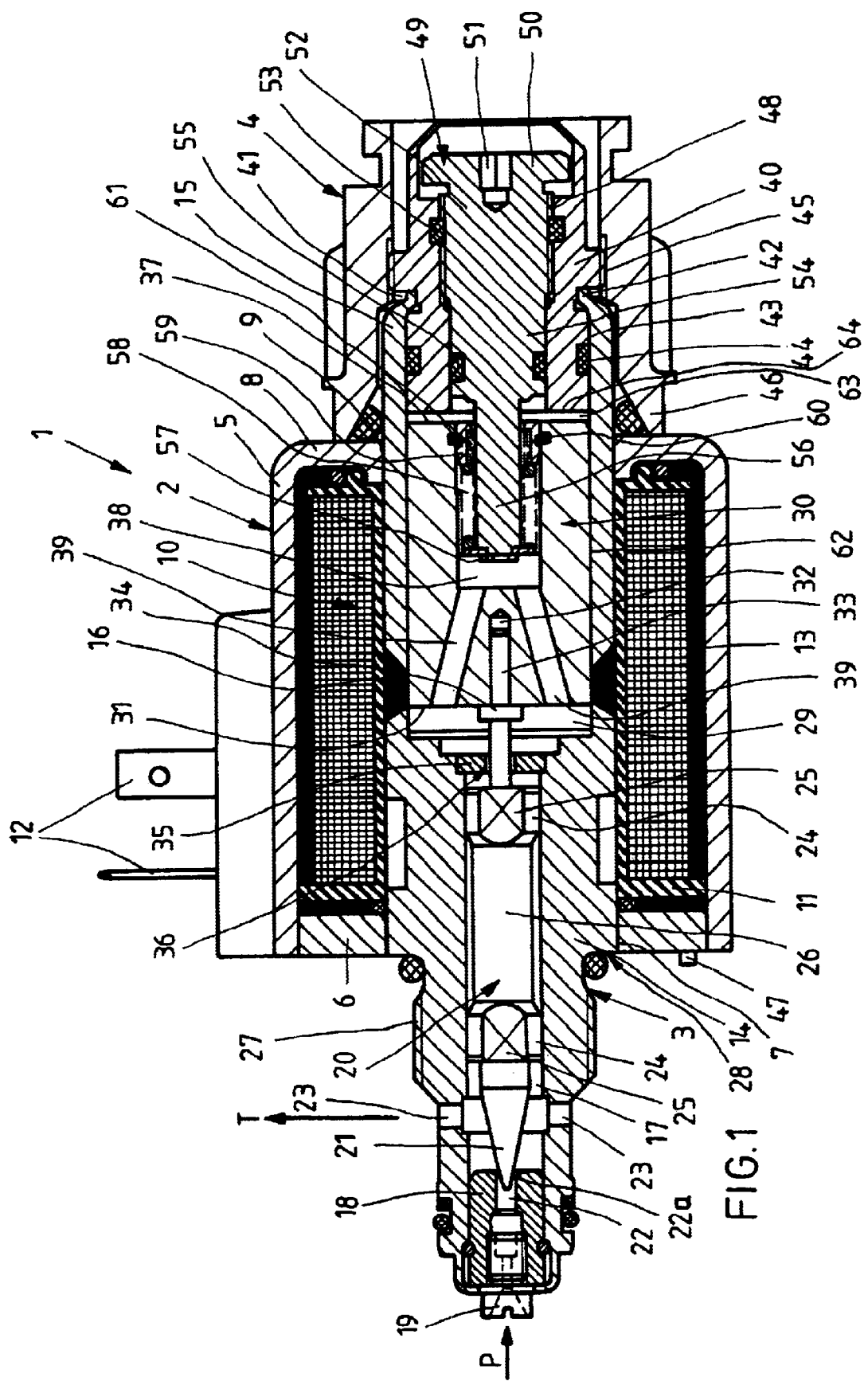
FIG. 1 shows a cross section through a proportional activation magnet according to the invention.

FIG. 1 shows a proportional activation magnet 1 according to the invention in cross section. The activation magnet 1 is divided essentially into an activation coil 2 and into a pole 3 onto which the activation coil 2 is fitted and mounted with a plastic nut 4.

The activation coil 3 has a coil housing 5 which is essentially in the form of a pot. An annular washer 6 is inserted on an open end face of the coil housing 5, said annular washer 6 having a passage opening 7 in which the pole 3 is arranged. On the end face lying opposite the annular washer 6, the shape of the coil housing changes so as to form a housing base 8 in which a base opening 9 is provided which is flush with the outside of the pole 3. In the cavity formed by the outside of the pole 3 and the coil housing 5, the solenoid 10 is arranged which has a multiplicity of coil turns which are provided on a coil former 11 and are connected to two connecting lugs 12 which are provided on the outside of the coil housing 5. The volume not taken up by the solenoid 10 in the interior of the coil housing 5 is filled with a sealing compound 13.

The pole 3 is divided into a valve cone region 14 which is located to the left in FIG. 1 and which is adjoined by a pole tube 15 which is located to the right in FIG. 1. Here, a cone region 16 is provided in a junction region between the valve cone region 14 and the pole tube 15, said cone region 16 being embodied as an antimagnetic material region which is connected in one piece to the valve cone region 14 and the pole tube 15. The junction region between the pole tube 15, cone region 16 and valve cone region 14 is shaped in such a way that a force which is proportional to the applied current is generated on the valve cone 20 with the activation magnet 1.

The valve cone region 14 is provided with an axially extending and continuous valve cone bore 17. In the emerging end of the valve cone bore 17 a valve seat 18 is inserted in which an inlet nozzle 19 is arranged. In the state shown in FIG. 1, a valve cone 20 which is inserted into the valve cone bore 17 projects with a tip 21 of a cone into the seat bore 22 of the valve seat 18 and forms a throttle gap with the valve seat edge 22a. The activation magnet operates as a directly activated proportional pressure limiting valve and regulates the pressure in the inflow P. In the control position, hydraulic fluid can flow from the inflow P the seat bore 22, the throttle gap on the valve seat edge 22a into the valve cone bore 17 and flow out of it again via tank connecting openings 23 provided radially in the valve cone region 14.

The valve cone 20 has, in addition to the tip 21 of the cone, two essentially cylindrical guide sections 24 which are provided with overflow flattened portions 25 which can be seen particularly well in this view. The two guide sections 24 are connected to one another by means of a connecting section 26 with a relatively small diameter. The external diameter of the guide sections is dimensioned in such a way that the valve cone 20 is movably guided in the valve cone bore 17.

On its outside, the valve cone region 14 of the pole 3 is provided with a pole thread 27 and on also with a stop shoulder 28 which, in the state in which the pole 3 is screwed into a valve housing (not shown in this view), bears against the valve housing.

In the interior of the pole tube 15, an armature space 29 with a cylindrical pole tube bore 62 is formed, an armature 30 with an essentially cylindrical shape being inserted in an axially displaceable fashion in said pole tube bore 62.

The pole tube bore 62 is completely lined with a film bearing (not shown here), manufactured from teflon material for example. The dimensions of the pole tube bore 62 and of the armature 30 are selected such that the film bearing completely fills the intermediate space between the outside of the armature 30 and the pole tube bore 62, the armature 30 being still easily displaceable within the pole tube bore 62.

The armature 30 has, in its tappet end face 31 located to the left in FIG. 1, a tappet blind hole 32 in the center, into which a rod-shaped armature tappet 33 is inserted. An annular tappet shoulder 34 with which the armature tappet 33 is supported on the tappet end face 31 of the armature 30 is formed here on the armature tappet 33. The end of the armature tappet 33 which points away from the armature 30 rests on the end face of the guide section 24 of the valve cone 20 which is located to the right in FIG. 1.

The armature tappet 33 runs here in a region between the tappet end face 31 and the guide section 24 through a baffle plate 35 which is inserted into the pole 3 in a junction region between the armature space 29 and the valve cone bore 17. The baffle plate 35 is provided for this purpose with a centrally arranged tappet bore 36. The baffle plate 35 is tightly connected to the pole 3 at its outer circumference so the activation magnet 1 functions well. The tappet bore 36 is of such small dimensions that the armature tappet 33 can still just move essentially without friction within the tappet bore 36 given axial movements of the armature 30.

The armature 30 also has on its rear end face 37 lying opposite the tappet end face 31 a spring chamber 38 which is formed as a blind hole. The base of the spring chamber 38 is connected via two through ducts 39 to the tappet end face 31 in such a way that given movements of the armature 30 within the armature space 29 hydraulic fluid can pass through the through ducts 39.

The pole tube 15 is sealed on its end located on the right in FIG. 1 with a metallic closure lid 40. For this purpose, the closure lid 40 has a circumferential burred groove 41 which is arranged on the outside and into which a pole tube edge 42 of the pole tube 15 is pressed when the closure lid 40 is inserted into the pole tube 15. In the part of the closure lid 40 which is located in the interior of the pole tube 15, an annular groove 43 into which a sealing ring 44 is inserted is formed on the outside so that a sealed connection is produced between the outside of the closure lid 40 and the inside of the pole tube 15.

On the outside of the closure lid 40 which is located outside the pole tube 15, a securing thread 45 is formed which interacts with an inner thread, complementary thereto, of the plastic nut 4. As a result, the plastic nut 4 can be screwed onto the closure lid 40 where it acts with a nut underside 46 on the housing base 8 of the coil housing 5 and presses said base tightly against a valve housing (not illustrated in this view) into which the pole 3 is screwed. A locking cam 47 which is provided on the underside of the annular washer 6 and which engages in a locking cam opening (not shown in this view) in the valve housing prevents the coil housing 5 from rotating with respect to the valve housing.

The closure lid 40 has in the interior an axially extending and continuous adjustment screw bore 48 into which an adjustment screw 49 is inserted. The adjustment screw 49 has here a screw head 50 in which a hexagon socket opening 51 is formed. The screw head 50 is adjoined by a threaded region 52 which interacts with a corresponding inner thread region on the closure lid 40. In addition, in the threaded region 52 between the closure lid 40 and the adjustment screw 49 a plastic ring 53 is provided for preventing rotation of the adjustment screw 49 in the closure lid 40. Furthermore, the adjustment screw 49 has a sealing region 54 in which a sealing ring 55, which provides a seal between the adjustment screw 49 and the adjustment screw bore 48, is arranged on the outside.

Starting from the sealing region 54, a rod-shaped restoring spring carrier 56 of the adjustment screw 49 extends into the spring chamber 38 of the armature 30. The restoring spring carrier 56 has, at its end, a stop disk 57 on which one end of an oscillation damping spring 58 is supported. The other end of the oscillation damping spring 58 is supported in the state shown in FIG. 1 on a stop sleeve 59 which is mounted in the spring chamber 38 and which is axially fixed with respect to the armature 30 by means of a securing ring 60 which engages both in a groove in the stop sleeve 59 and in a groove in the spring chamber 38.

Here, an armature retraction spring 61 which, in the state shown in FIG. 1, is pressed together by the effect of the oscillation damping spring 58 is inserted in the interior of the stop sleeve 59 in a region between the restoring spring carrier 56 and the wall of the stop sleeve 59.

FIG. 2 shows a cross section through a partial region of the armature 30 and the adjustment screw 49 in a state in which the armature 30 is displaced to the right in comparison with the state shown in FIG. 1.

As can be seen particularly well in this view, the stop disk 57 is securely connected to the restoring spring carrier 56 by burring a region of the material of said restoring spring carrier 56.

In the state shown in FIG. 2, the armature 30 is displaced to the right with respect to the adjustment screw 49 to such an extent that the oscillation damping spring 58 is relieved of tension with the exception of the residual biasing force of the armature retraction spring 61. With the end located to the right in FIG. 2, the oscillation damping spring 58 rests on the left-hand end of the armature retraction spring 61.

During operation, the actuation magnet 1 according to the invention behaves as follows. When there is a current through the solenoid 10, the armature 30 is drawn into the pressure control position shown in FIG. 1 in which it acts on the valve cone 20 via the armature tappet 33 in such a way that the tip 21 of the cone forms a predetermined throttle gap with the valve seat edge 22*a*. In order to equalize the stroke volume of the armature tappet 33 which moves to the left out of the armature space 29 given movements of the armature 30, hydraulic fluid flows out of the valve cone bore 17 into the annular space 29 via the annular gap between the tappet bore 36 and the armature tappet 33. In addition, the hydraulic fluid in the armature space 29 is expelled by the armature 30 and flows via the through ducts 39 in the armature 30 and via the spring chamber 38 into the rear armature space 63.

Given a movement of the armature 30 to the right, the armature 30 pushes the hydraulic fluid out of the rear armature space 63 and into the armature space 29 via the spring chamber 38 and the through ducts 39. The excess hydraulic fluid in the armature space 29, corresponding to the tappet volume which is being forced in, escapes via the annular gap between the tappet bore 36 and armature tappet 33 back into the valve cone bore 17.

If rapid changes in pressure occur in the seat bore 22 in the control position of the armature 30 or rapid changes in flow are switched to the solenoid 10, the armature moves to the left and right at high speed. In the process, a large quantity of hydraulic fluid briefly flows from the armature space 29 into the rear armature space 63 and back. In the through ducts 39, the spring chamber 38, past the stop disk 57, the oscillation damping spring 58 and the armature retraction spring 61 the flow is subjected to resistance so that during a stroke of the armature 30 to the left in the armature space 29 a back pressure is built up which also acts on the tappet end face 31 and thus brakes the movement of the armature 30 to the left.

The hydraulic fluid flowing out of the armature space 29 into the valve cone bore 17 is thus subjected to a high resistance by the small annular gap surface between the tappet bore 36 and armature tappet 33, as a result of which a back pressure can build up in the armature space 29. In the same way, during a stroke of the armature 30 to the right, a back pressure which acts on the rear end face 37 of the armature 30 and brakes the movement of the armature builds up in the rear armature space 63. AS a result, the armature movements are damped in both directions.

In addition, the oscillation damping spring 58 damps the control strokes of the armature 30 in both directions. If a pressure oscillation builds up in the seat bore 22 and the pressure drops in the process below the predefined value, the valve cone 20 moves with the armature 30 to the left and reduces the throttle gap between the valve edge 22a and valve cone tip 21. At the same time, the oscillation damping spring 58 is biased to a greater extent and as a result of the high spring constant of this spring the control stroke of the valve cone 20 to the left is reduced. If the pressure in the seat bore 22 rises above the predefined value, the high hydraulic force acting on the valve cone tip 21 pushes the valve cone 20 and the armature 30 to the right. Here, the oscillation damping spring 58 is relieved of tension in accordance with its spring constant. The magnetic force which is stored in the oscillation damping spring 58 is freed and rises by the amount by which the spring force decreases. The control stroke of the valve cone to the right is thus reduced. The damping devices disclosed prevent the control movements of the valve cone 20 and armature 30 from becoming too large, as a result of which sustained oscillations are effectively suppressed.

If the electrical current on the solenoid 10 is reduced to a small bias current, the oscillation damping spring 58 presses the armature 30 to the right by the biasing stroke of this spring which is only a few tenths of a millimeter. The armature retraction spring 61 then pushes the armature 30 against the closure lid stop face 64. As a result, a large throttle gap, which opposes the flowing hydraulic fluid with only a small resistance, is produced between the valve seat edge 22a and valve cone tip 21.

I claim:

1. A hydraulic solenoid valve with a proportional activation magnet (1), comprising:

a pole (3) with a valve cone receiving bore (17) for receiving a valve cone (20), an essentially cylindrical pole tube (14) with a pole tube bore (62) for receiving an essentially cylindrical armature (30), wherein a cross section of the armature is essentially the same size as a cross section of the bore of the pole tube to enable the outer surface of the armature to provide circumferential contact with the inner surface of the bore while permitting the armature to slide axially along the bore, an armature tapplet located between the armature (30) and the valve cone (20) and connecting the armature to the valve cone, the armature tappet (33) having a smaller diameter than the armature (30) and the valve cone (20), a baffle plate extending transversely of the bore of the pole tube and having an orifice defining a tappet passage opening (36) for the armature tappet (33), the baffle plate being provided between the pole-tube bore (62) and the valve-cone reception bore (17), there being an annular gap between the inside of the tappet passage orifice (36) and the outside of the armature tappet (33) having a width providing clearance for the armature tappet (33) to be freely movable in the tappet passage orifice (36) while constricting a flow of pressure fluid between the valve cone bore and the pole-tube bore (62) to inhibit oscillation of the armature.

2. The solenoid valve as claimed in claim 1, wherein the ratio of the width of the annular gap to the diameter of the armature tappet is smaller than 0.25.

3. The solenoid valve as claimed in claim 2, wherein the ratio of the width of the annular gap to the diameter of the armature tappet is less than 0.05.

4. The solenoid valve as claimed in claim 1, wherein a retention area is provided by the baffle plate (35).

5. The solenoid valve as claimed in claim 1, further comprising a foil bearing located between the armature (30) and the pole tube bore (62).

6. The solenoid valve as claimed in claim 5, wherein the film bearing essentially completely fills a space between the outer surface of the armature (30) and the inner surface pole tube bore (62).

7. The solenoid valve as claimed in claim 1, wherein the pole tube (14) has a closure lid (40) on its side facing away from the valve cone receiving bore (17).

8. The solenoid valve as claimed in claim 7, wherein the closure lid (40) has an adjustment screw (49) for setting a working point of the armature (30).

9. The solenoid valve as claimed in claim 7, wherein the closure lid (40) has a restoring device (57, 58, 59, 61) for applying restoring force to the armature (30).

10. The solenoid valve as claimed in claim 9, wherein the restoring device (57, 58, 59, 61) is embodied such that the armature (30) can have applied thereto a restoring force which has a nonlinear characteristic curve over a stroke of the armature (30).

11. The solenoid valve as claimed in claim 10, wherein the restoring device has an oscillation damping spring (58) and an armature retraction spring (61), connected in series with the oscillation damping spring (58), with a relatively small spring constant, for canceling an effect of the armature retraction spring (61) when a predetermined restoring force is exceeded.

12. The solenoid valve as claimed in claim 11, wherein the armature (30) has a spring space which extends in axial direction and is a blind hole (38).

13. The solenoid valve as claimed in claim 12, wherein the armature (30) has at least one equalization bore (39) which extends in particular from a bore base of the blind hole (38) to an end face (31) of the armature (30).

14. The solenoid valve as claimed in claim 1, wherein said essentially cylindrical armature (30), is mounted with its outside axially displaceable in the pole-tube bore by a film mounting.

* * * * *